United States Patent
Schrubbe

(10) Patent No.: US 9,964,418 B2
(45) Date of Patent: May 8, 2018

(54) INTER-SENSOR COMMUNICATION SYSTEM FOR ABSOLUTE POSITION SENSING

(71) Applicant: Joral LLC, Mukwonago, WI (US)

(72) Inventor: Carl D. Schrubbe, Waukesha, WI (US)

(73) Assignee: Joral LLC, Mukwonago, WI (US)

( * ) Notice: Subject to any disclaimer, the term of this patent is extended or adjusted under 35 U.S.C. 154(b) by 0 days. days.

(21) Appl. No.: 15/348,111

(22) Filed: Nov. 10, 2016

(65) Prior Publication Data
US 2017/0184420 A1    Jun. 29, 2017

Related U.S. Application Data

(60) Provisional application No. 62/217,146, filed on Sep. 11, 2015.

(51) Int. Cl.
*G01D 5/14* (2006.01)
*G01D 5/249* (2006.01)

(52) U.S. Cl.
CPC .......... *G01D 5/145* (2013.01); *G01D 5/2497* (2013.01)

(58) Field of Classification Search
CPC .............................. G01D 5/145; G01D 5/2497
USPC ..................................... 324/207.25
See application file for complete search history.

(56) References Cited

U.S. PATENT DOCUMENTS

| | | |
|---|---|---|
| 4,567,466 A | 1/1986 | Bozarth et al. |
| 4,860,216 A | 8/1989 | Linsenmayer |
| 5,406,077 A | 4/1995 | Aoki et al. |
| 7,025,328 B2 | 4/2006 | Ulicny et al. |
| 7,219,563 B2 | 5/2007 | Saito |
| 8,294,457 B2 | 10/2012 | Schrubbe et al. |
| 9,018,943 B2 | 4/2015 | Schrubbe |
| 9,374,948 B2 | 6/2016 | Schrubbe et al. |
| 9,404,990 B2 | 8/2016 | Ausserlechner et al. |
| 9,451,218 B2 | 9/2016 | Hanabusa |
| 9,470,557 B2 | 10/2016 | Nagura |
| 2001/0029408 A1 | 10/2001 | Murray et al. |
| 2006/0245381 A1 | 11/2006 | Baxter et al. |
| 2008/0170469 A1 | 7/2008 | Phillips et al. |
| 2010/0008272 A1 | 1/2010 | Messinger et al. |
| 2010/0225308 A1* | 9/2010 | Kurumado ........... G01D 5/2451 324/207.25 |
| 2010/0317295 A1 | 12/2010 | Borsella et al. |
| 2010/0321006 A1* | 12/2010 | Suzuki .................. G01D 5/145 324/207.25 |
| 2011/0150496 A1 | 6/2011 | Feher |

(Continued)

FOREIGN PATENT DOCUMENTS

| | | |
|---|---|---|
| WO | 2016008801 | 1/2016 |
| WO | 2016024958 | 2/2016 |

*Primary Examiner* — Jay Patidar
(74) *Attorney, Agent, or Firm* — Boyle Frederickson S.C.

(57) ABSTRACT

By configuring independently controlled clock signals to a plurality of sensors, preferably an angle sensor and a turn sensor, in communication with one another, a wider variety of sensors and sensor combinations can be used while still being able to synchronize output data of the sensors. Independently controlling clock signals of the sensors to selectively control the timing and portion(s) of data being communicated between the sensors enables data of the sensors to be merged, fused or otherwise combined using different types of sensors whose outputted data ordinarily cannot easily be combined.

19 Claims, 8 Drawing Sheets

(56) References Cited

U.S. PATENT DOCUMENTS

| | | |
|---|---|---|
| 2011/0310954 A1 | 12/2011 | Sawaoka et al. |
| 2013/0179117 A1 | 7/2013 | Delbaere et al. |
| 2015/0176963 A1 | 6/2015 | Diaconu et al. |
| 2016/0265942 A1 | 9/2016 | Kawamura et al. |
| 2016/0329745 A1 | 11/2016 | Linder |
| 2016/0373617 A1 | 12/2016 | Choi |
| 2017/0030742 A1 | 2/2017 | Mochizuki et al. |
| 2017/0219380 A1 | 8/2017 | Schaefer |

* cited by examiner

INTER-SENSOR COMMUNICATION SYSTEM FOR ABSOLUTE POSITION SENSING

CROSS-REFERENCE

Pursuant to 35 U.S.C. § 119(e), this application claims all benefits to and priority in U.S. Provisional Application Ser. No. 62/217,146, filed on Sep. 11, 2015, the entirety of which is hereby expressly incorporated by reference herein.

FIELD

The present invention relates generally to position sensors including rotary position sensors, and more particularly, to an inter-sensor communication system in which an angle sensor and a turn sensor are configured to communicate for absolute position sensing.

BACKGROUND

Rotary encoders of optical or magnetic construction are used to measure or sense rotation, typically of a shaft or the like, by providing rotational-related data from which information, such as absolute or relative rotary position can be determined. Rotary encoders are very versatile and used in applications that frequently require controlling the motion of a rotating object, such as a shaft or the like. Other applications include: monitoring motor feedback, cut-to-length applications, filling applications, backstop applications, robotics, etc.

Optical rotary encoders typically use a circular disk that has sections coded, such as by being blacked out or otherwise marked, that turns with the object whose rotary movement is being measured. A sensor reads light reflected from the disk in determining whether there has been a change in rotary position of the disk.

While optical rotary encoders have enjoyed a great deal of commercial success, they nonetheless suffer from numerous drawbacks. They are undesirably complicated, sensitive to dust, oil and dirt, mechanically fragile, typically cannot be used in relatively high temperature environments, and are susceptible to shock and vibration.

Magnetic rotary encoders have a construction that overcomes most, if not nearly all, of these disadvantages. Many magnetic rotary encoders include relatively precise axial and radial positioning of an encoder shaft-mounted magnet used to excite Hall Effect sensors that define a sensor region of a magnetic rotary encoder chip.

In some applications, to determine an absolute position, a first magnetic rotary encoder chip (angle sensor) can be used to sense a current angle of the rotary system with respect to a first reference line, while a second magnetic rotary encoder chip (turn sensor) can be used to track a count of complete rotations or turns of the rotary system with respect to a second reference line. For example, as a rotary system rotates, the angle sensor can sense this condition accordingly and can determine a current angle of the system with respect to the first reference line. In addition, as the system rotates through a complete rotation in positive/clock-wise direction with respect to the second reference line, the turn sensor can sense this condition and increment a count by one. Conversely, as the system rotates back in a negative/counter-clock-wise direction past the second reference line, the turn sensor can sense this condition and decrement the count by one. The count from the turn sensor and the current angle from the angle sensor together can provide an absolute position when queried.

While precise alignment between the aforementioned reference lines of the sensors is ideal, in practical implementations, some error between the reference lines typically exists. As a result, it is oftentimes necessary for one of the sensor chips, or a microcontroller in the system, to synchronize the measurements between the sensor chips in order to determine a consistent absolute position. However, for one of the sensor chips to synchronize the measurements, it is often necessary for the other sensor chip to present sensed data in a predetermined way that would be recognized by the synchronizing sensor chip. This limits the possibility of sensor chips to ones that are strictly compatible in this regard, which might not include sensor chips providing the highest accuracy, lowest power consumption and/or lowest cost. Also, for the microcontroller to synchronize the measurements, it is often necessary to implement additional software for the microcontroller to execute. This can result in inefficient processing delays which may not be acceptable in the system.

What is therefore needed is a system for absolute position sensing which overcomes one or more of the aforementioned drawbacks.

SUMMARY

The present inventor has recognized that by configuring independently controlled clock signals to a plurality of sensors, preferably an angle sensor and a turn sensor, in communication with one another, a wider variety of sensors and sensor combinations can be used while still being able to synchronize output data of the sensors. Independently controlling clock signals of the sensors to selectively control the timing and portion(s) of data being communicated between the sensors enables data of the sensors to be merged, fused or otherwise combined using different types of sensors whose outputted data ordinarily cannot easily be combined.

An inter-sensor communication system of the invention utilizes a processor to selectively and independently control clock signals of the plurality of different types of sensors to thereby selectively control the timing and portion(s) of sensor output data communicated between the sensors thereby advantageously enabling sensor output data from the plurality of dissimilar types of sensors to be merged, fused or otherwise combined. A preferred inter-sensor communication system utilizes a processor to selectively and independently control clock signals of an angle sensor and a turn sensor to synchronize measurement data outputted by the sensors in merging, fusing or otherwise combining the data in a manner that outputs absolute position or enables absolute position to be determined. This can be accomplished by using the independently controlled clock signals to selectively control the timing and portions of data being communicated between the sensors. As a result, higher accuracy, lower power consumption and/or lower cost sensors that might not otherwise be configured to provide sensed data in predetermined ways which can be expected by other sensors can nevertheless be used to achieve optimum performance.

If desired, the inter-sensor communication system can include an angle sensor in communication with a turn sensor. The angle sensor and the turn sensor can be attached to a rotary system which the angle sensor and the turn sensor are intended to sense to provide an output indicating absolute position.

The angle sensor can sense an angle of rotation of the rotary system. The angle sensor can be used to determine a current angle of the rotary system with respect to a first reference line. The turn sensor can maintain a count of sensed rotations of the rotary system. The turn sensor can be used to track a count of complete rotations or turns (positive or negative) of the rotary system with respect to a second reference line.

A first clock signal can causes the angle sensor to communicate a sensed angle of rotation to the turn sensor. A second clock signal causes the turn sensor to communicate an output including the sensed angle of rotation and the count. The angle sensor and the turn sensor can be arranged on one or more circuit boards.

Optionally, multiple circuit boards can be arranged in a housing to operate as the inter-sensor communication system attached in the rotary system. The angle sensor, the turn sensor and various electronics can be mounted, for example, on opposing sides of a first circuit board and can be in communication with one another. A permanent magnet can be axially aligned with centers of the angle sensor and the turn sensor so as to react with a sensor region of the turn sensor and a sensor region the angle sensor. The aforementioned sensor regions can include Hall Effect sensors on each of the sensor chips.

If desired, a second circuit board can be disposed over the first circuit board. A microcontroller (which can include a microprocessor, controller or other processing logic) and various electronics can be mounted on the second circuit board and can be in communication with the turn sensor and the angle sensor on the first circuit board. A battery can also be mounted on the second circuit board so as to retain sensor measurements and data held by the angle sensor, the turn sensor and the microcontroller. The microcontroller can be configured to independently control first and second clock signals to the angle sensor and the turn sensor, respectively, so as to selectively control the timing and portions of data being communicated between the sensors. Accordingly, the first clock signal can be controlled to cause the angle sensor to communicate a sensed angle of rotation to the turn sensor, and the second clock signal can be controlled to cause the turn sensor to communicate an absolute position including the sensed angle of rotation and the count.

If desired, a third circuit board can be disposed over the second circuit board. A connector and various electronics can be mounted on the third circuit board and can be in communication with the microcontroller on the second circuit board. The connector can be used to route cable and wiring for reporting the absolute position sensed by the rotary encoder.

If desired, the inter-sensor communication system can provide a method for position sensing. An angle sensor and a turn sensor can be communicating with one another. The angle sensor and the turn sensor can be attached to a rotary system which the angle sensor and the turn sensor are intended to sense for providing an output indicating absolute position. The angle sensor can sense an angle of rotation of the rotary system. The angle sensor can be used to determine a current angle of the rotary system with respect to a first reference line. The turn sensor can maintain a count of sensed rotations of the rotary system. The turn sensor can be used to track a count of complete rotations or turns (positive or negative) of the rotary system with respect to a second reference line. The first clock signal can causes the angle sensor to communicate a sensed angle of rotation to the turn sensor. The second clock signal causes the turn sensor to communicate an output including the sensed angle of rotation and the count.

These and other features and advantages of the invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications can be made within the scope of the present invention without departing from the spirit thereof, and the invention includes all such modifications.

DRAWING DESCRIPTION

Preferred exemplary embodiments of the invention are illustrated in the accompanying drawings in which like reference numerals represent like parts throughout, and in which.

Figure 1:
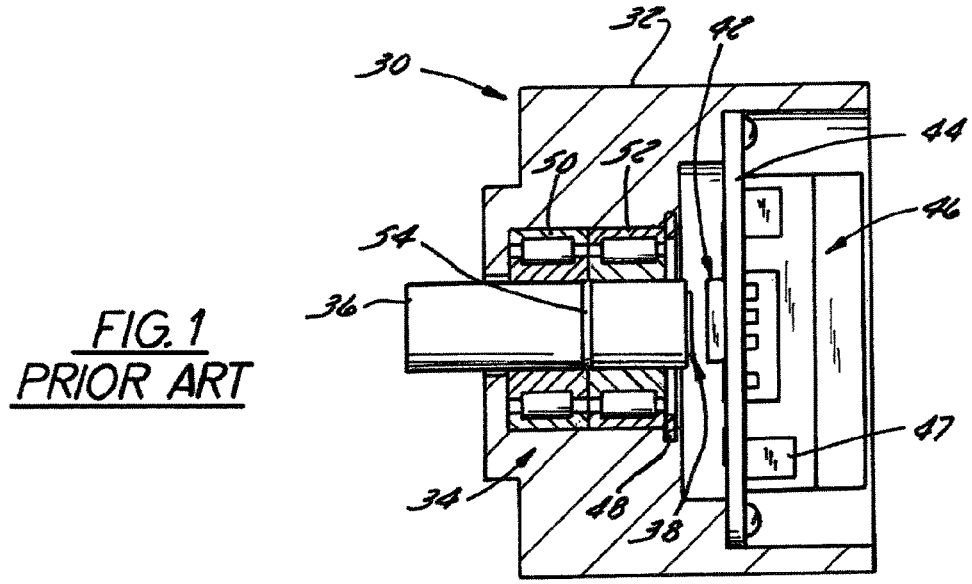
FIG. 1 is a cross sectional view of a prior art rotary magnetic encoder assembly illustrating a bearing arrangement used to precisely position an exciter magnet relative to a rotary magnetic encoder integrated circuit chip to ensure it outputs a good signal.
Figure 2:
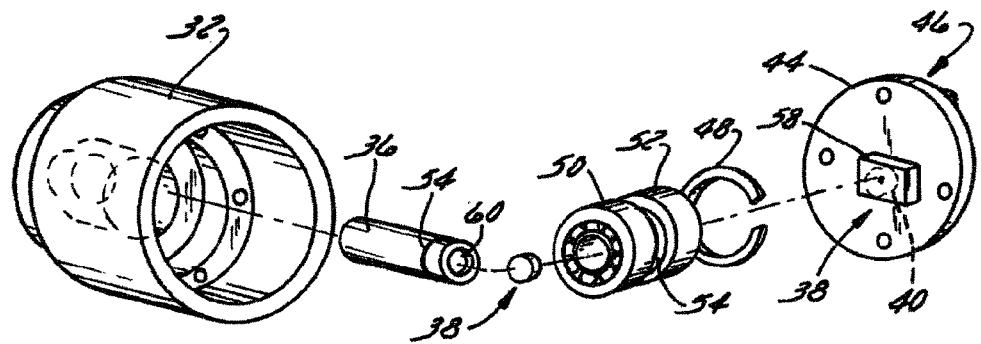
FIG. 2 is an exploded view of the prior art rotary magnetic encoder assembly of FIG. 1.
Figure 3:
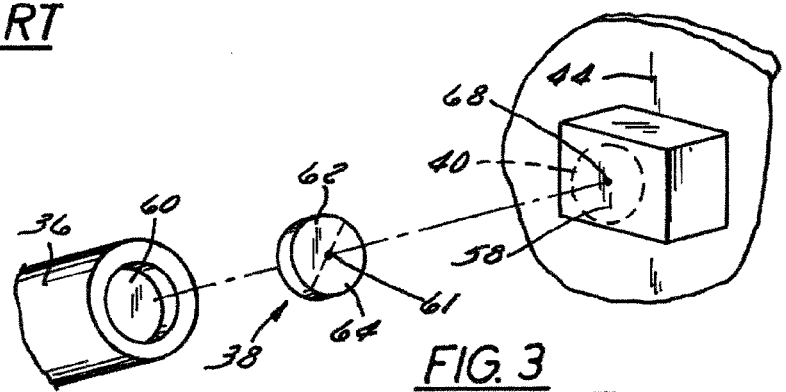
Figure 4:
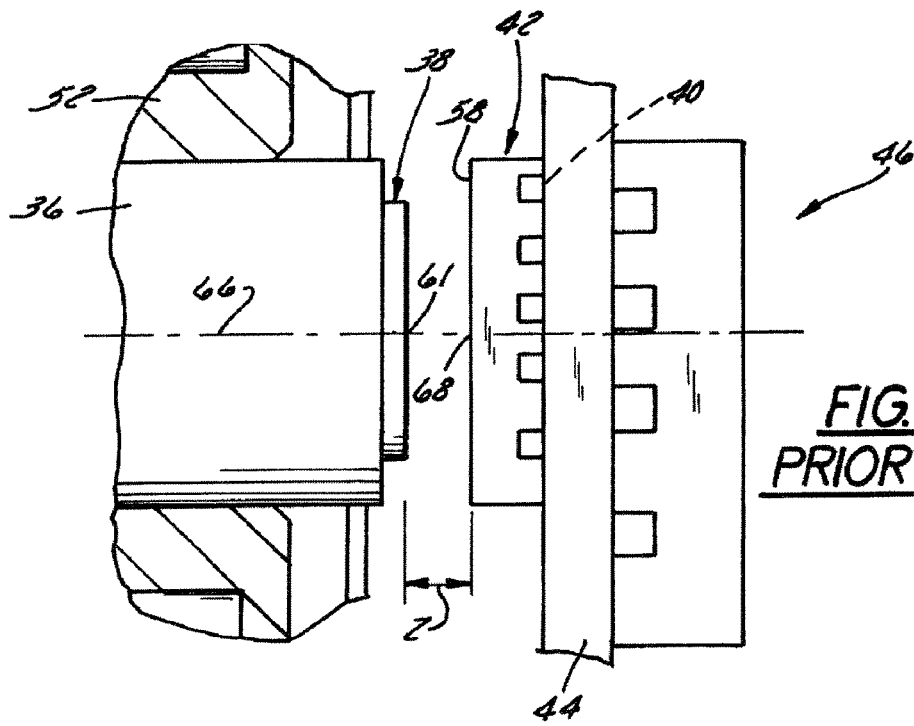
Figure 5:
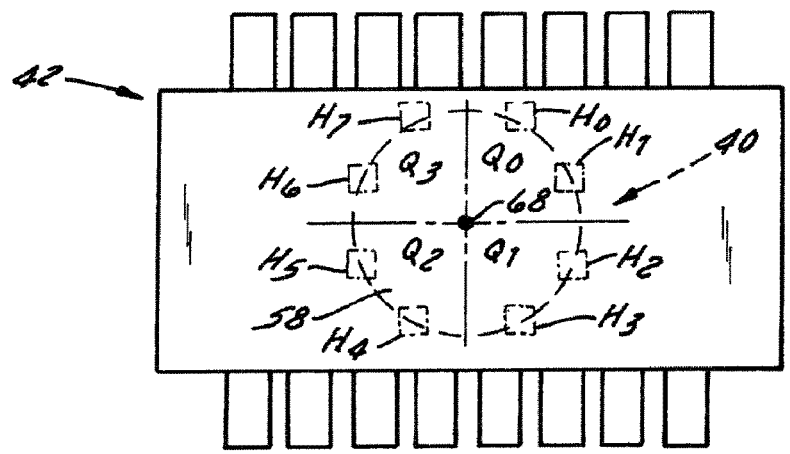
Figure 7:
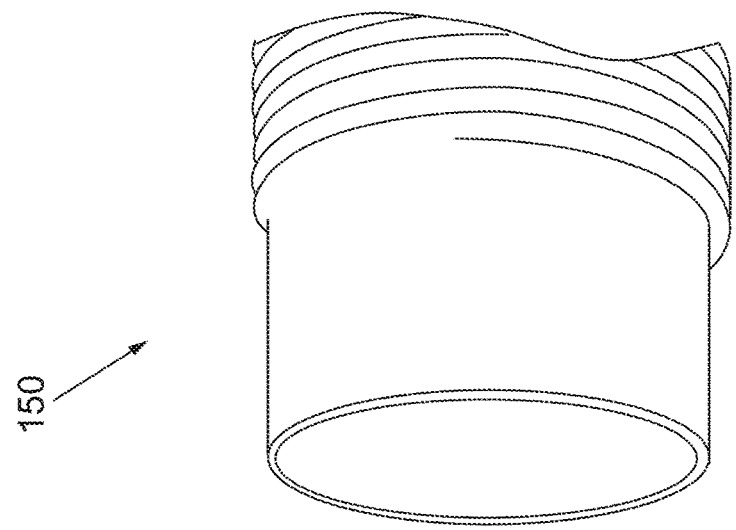
Figure 6:
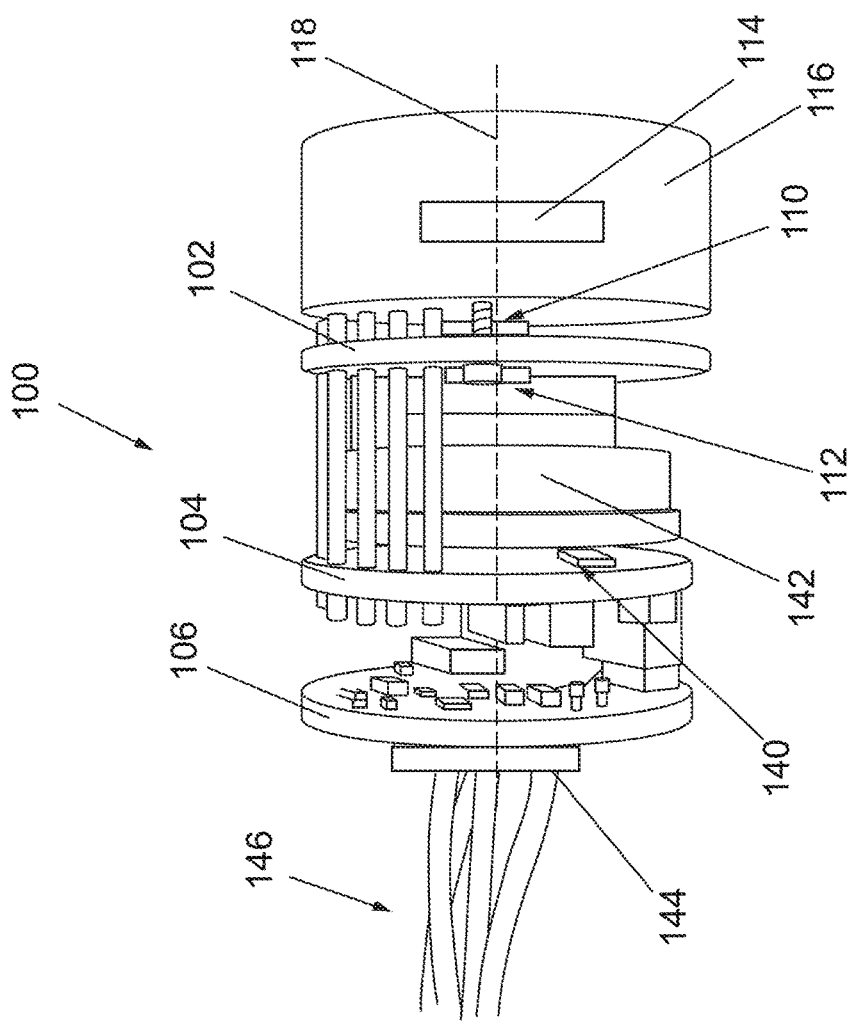
Figure 8:
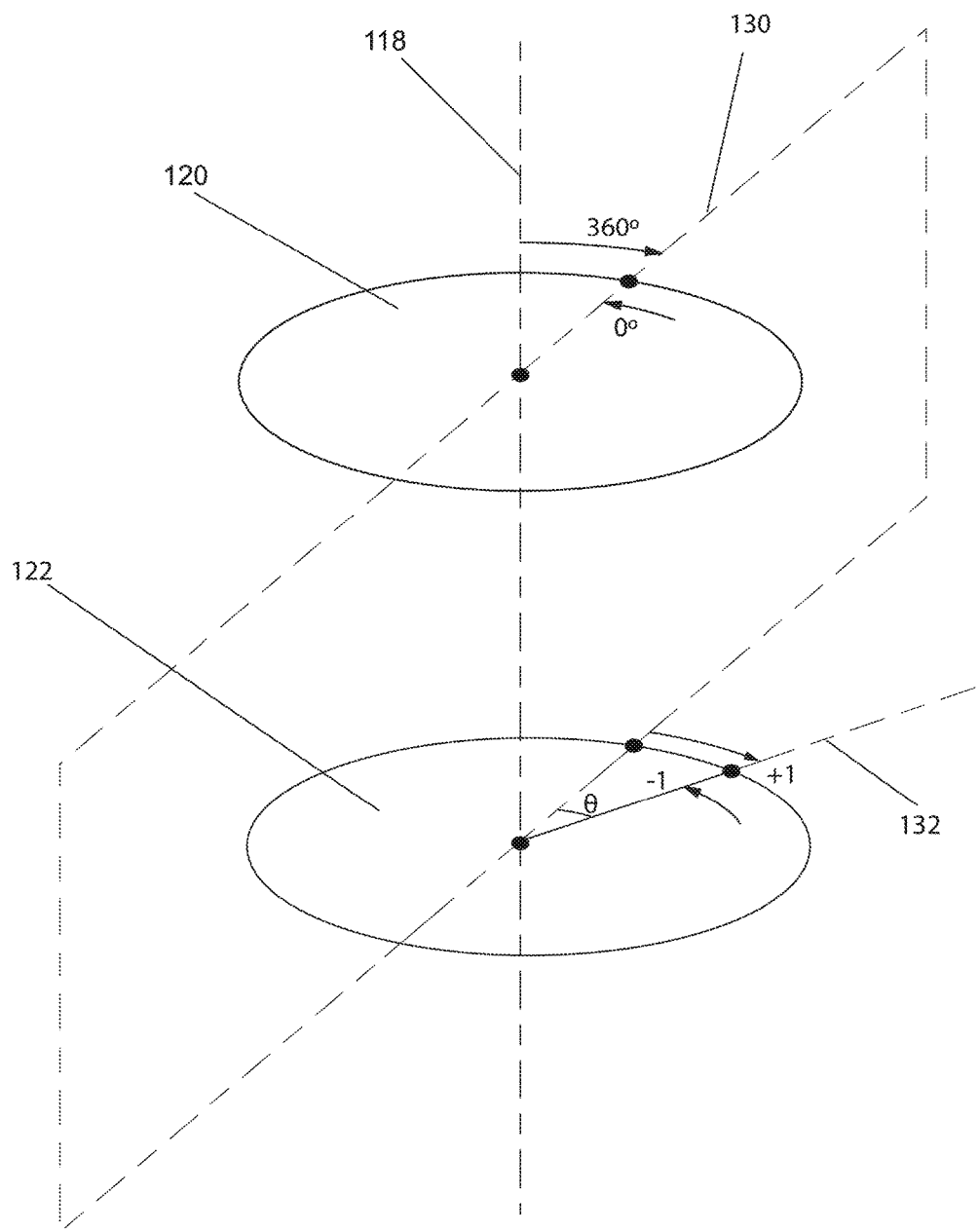
Figure 9:
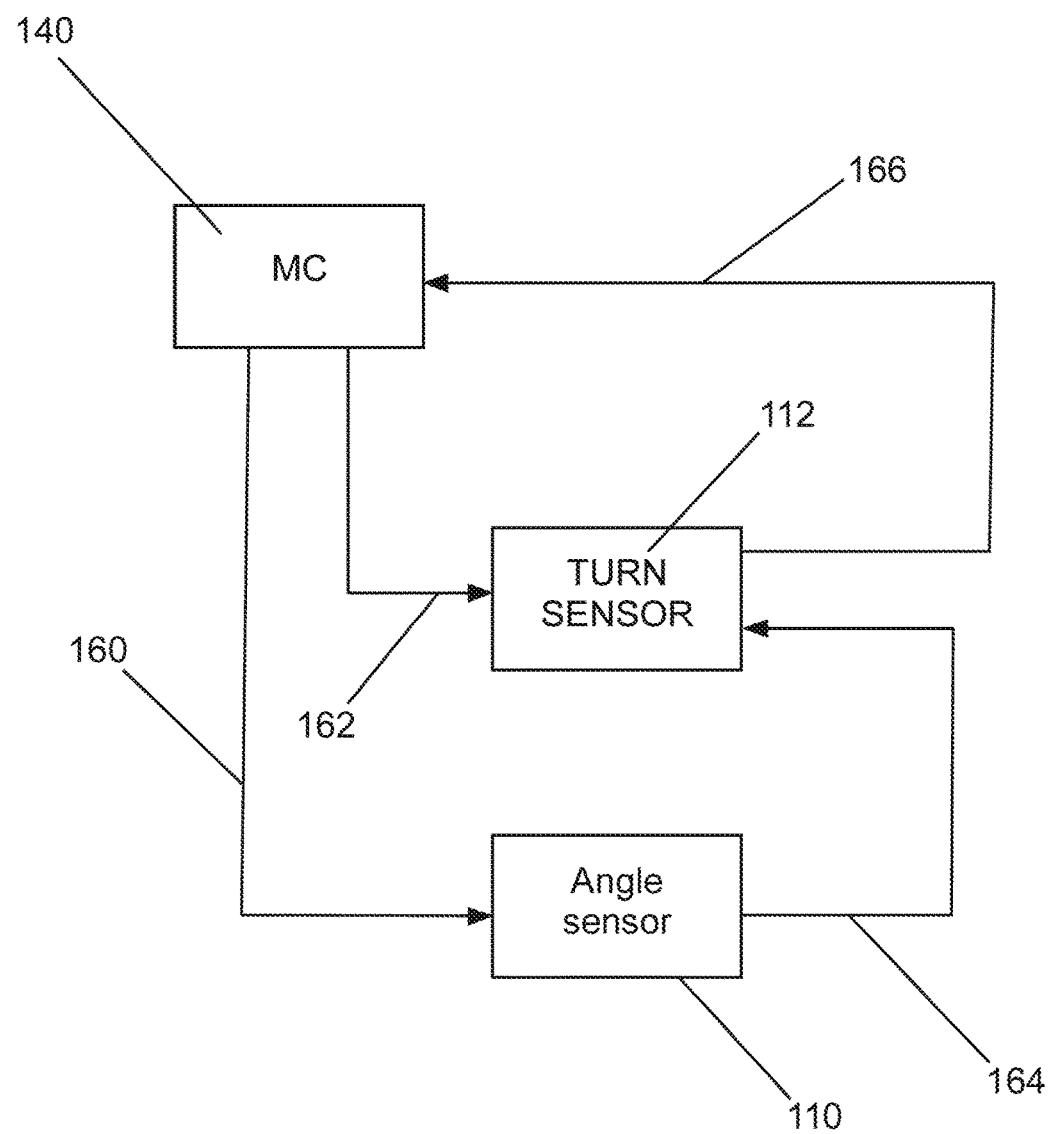
Figure 10:
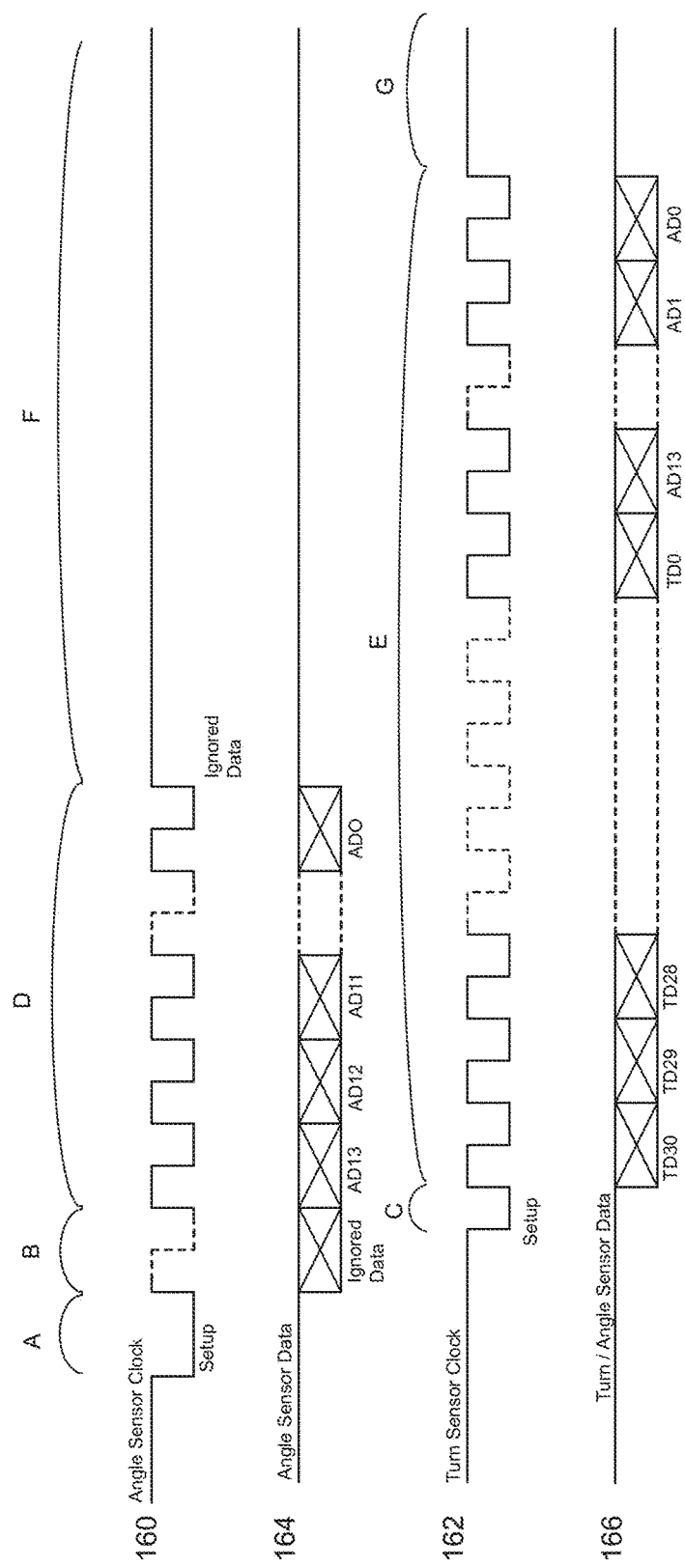
Figure 11:
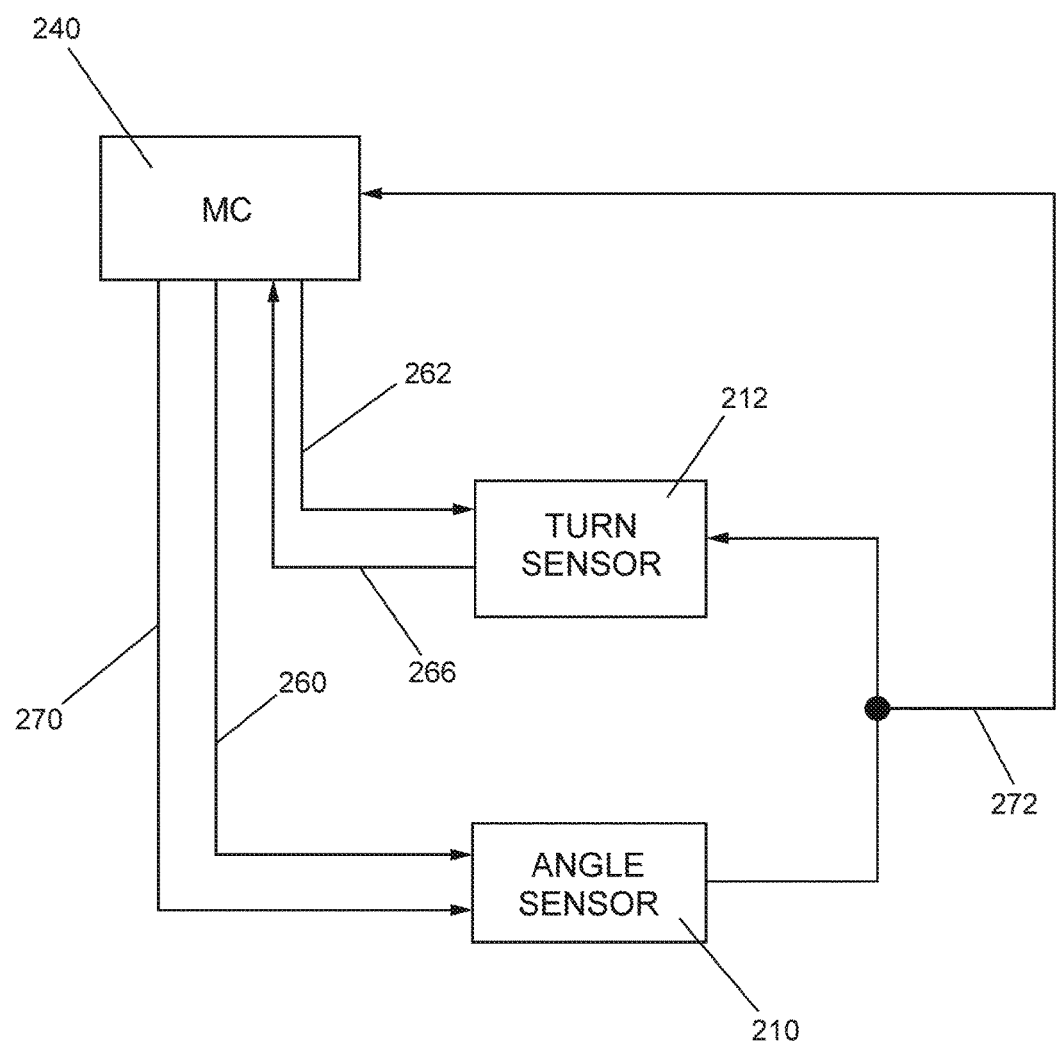
Figure 12:
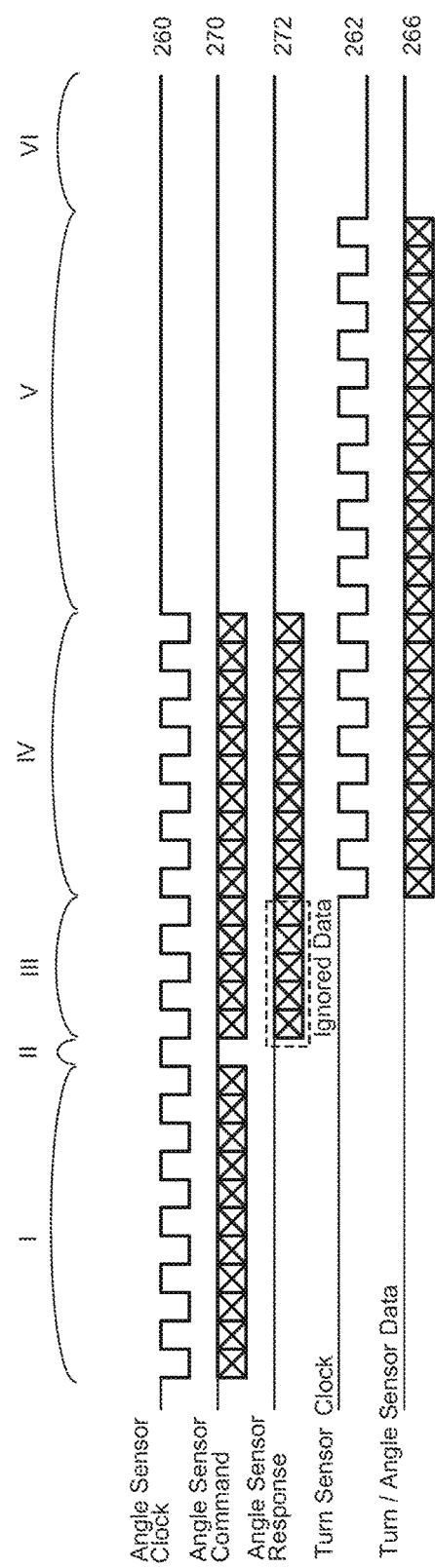

FIG. 3 in an enlarged fragmentary exploded view of an encoder shaft, exciter magnet and rotary magnetic encoder integrated circuit chip of the prior art rotary magnetic encoder assembly of FIG. 1;

FIG. 4 is an enlarged fragmentary cross sectional view of the encoder shaft and exciter magnet precisely located relative to the rotary magnetic encoder integrated circuit chip of the prior art rotary magnetic encoder assembly of FIG. 1;

FIG. 5 is a top plan view of the rotary magnetic encoder integrated circuit chip showing its sensor region comprised of an array of Hall Effect sensors or switches;

FIG. 6 is a rotary magnetic encoder according to an embodiment;

FIG. 7 is a housing for the rotary magnetic encoder according of FIG. 6;

FIG. 8 is a diagram of an angle sensor region and a turn sensor region for the rotary magnetic encoder of FIG. 7;

FIG. 9 is a circuit for a system for position sensing according to a first embodiment;

FIG. 10 is a timing diagram for the circuit of FIG. 9;

FIG. 11 is a circuit for a system for position sensing according to a second embodiment; and FIG. 12 is a timing diagram for the circuit of FIG. 11.

DETAILED DESCRIPTION

An example of a prior art rotary magnetic encoder 30 is shown in FIGS. 1-5. With specific reference to FIGS. 1-3, the encoder 30 has a substantially rigid housing 32 in which is fixed a bearing arrangement 34 that cooperates with a rotary encoder shaft 36 having a sensor exciter magnet 38 fixed in its free end that overlies a magnetic field sensor region 40 of a magnetic rotary encoder integrated circuit chip 42 attached to a circuit board 44 that is fixed to the housing 32. The circuit board 44 has onboard electronics 46 used to process data from the encoder chip 42 and output data or a signal that is representative of or which relates to rotary movement of the shaft 36 via a connector 47. Shaft 36 can be directly connected to that which is being measured or can be connected by a coupling (not shown) or the like to another shaft or other component that is being rotated or otherwise displaced in a manner lending itself to rotary encoder measurement.

The bearing arrangement 34 is held in place against the encoder housing 32 by a locking ring 48 and includes at least one shaft bearing 50, 52 to help ensure the shaft 36 runs axially true for preventing the magnet 38 from wobbling during shaft rotation. The bearing arrangement 34 also includes means to axially lock the shaft 36, such as by use of a ring 54 or the like that seats in a groove 56 (FIG. 2) formed in the shaft 36, so that the gap, Z (FIG. 4), between the end of the exciter magnet 38 and the outer surface 58 of the encoder chip 42 is maintained within a desired tolerance.

The exciter magnet 38 is a bi-polar disk-shaped permanent magnet that is fixed in a pocket 60 in the free end of the encoder shaft 36. The magnet 38 is bisected with one magnet half defining a North pole 62 and the other magnet half defining a South pole 64. The magnet 38 is relatively small, typically having a diameter of about 6 millimeters and a height or thickness of no more than about 2.5 millimeters, but is powerful as it is typically a rare earth Alnico (AlNiCo), samarium cobalt (SmCo5), or neodymium (NdFeB) magnet.

The location of the exciter magnet 38 must be precisely located relative to the sensor region 40 of the encoder chip 42. The magnet 38 must be centered such that its axial center 61 is substantially coaxial with an axis of rotation 66 of the shaft and a center 68 of the sensor region 40 within an accepted minimal tolerance. This is to ensure that an array of Hall sensors, $H_0$-$H_7$, arranged generally as depicted in FIG. 5 in four quadrants, $Q_0$-$Q_3$, of the sensor region 40 of the encoder chip 42 experience a relatively uniform magnetic field distribution from whichever pole of the magnet 38 is closest. Such an encoder chip 42 can have a greater or lesser number of Hall sensors. For example, such an encoder chip 42 can be equipped with as few as four Hall sensors.

A couple of preferred examples of a commercially available contactless rotary magnetic encoder chip having such a construction include an AS5040 and AS5046 rotary magnetic angle encoder integrated circuit chip made by Austria Microsystems of Tobelbaderstrasse 30, Schloss Premstaetten, Unterpremstaetten, Austria. The AS5046 is a 16 pin integrated circuit (IC) that includes an onboard array of Hall sensors, $H_0$-$H_7$, onboard amplifier therefor, onboard digital signal processor, onboard automatic gain control, onboard range pre-select, an onboard OTP (One-Time Programmable) register, an onboard digital to analog converter, and an onboard interface. Other examples of commonly used magnetic encoder chips of similar construction include an AS5040 10-bit programmable magnetic rotary encoder IC chip, an iC-MA Angular Hall Encoder chip made by iC Hause Integrated Circuits of Am Kuemmerling 18, 55294 Bodenheim, Germany, as well as an AM256 rotary magnetic encoder IC chip by Renishaw plc of New Mills, Wotton-under-Edge, Gloucestershire, United Kingdom As a result, the distance, Z, of the exciter magnet 38 from the outer surface 58 of the encoder chip 42 (and hence the distance of the magnet 38 from the array of Hall sensors, $H_0$-$H_7$), must be within an acceptable distance range depending on the field strength of the magnet 38 and the center of the magnet 38 (and rotational axis 66 of shaft 36) must be within an acceptable range of the center point 68 of the sensor region 40 of the encoder chip 42 or errors will undesirably result. For example, such errors can be in the form of increased signal noise in the output signal. Where a pair of offset sine or square waves is outputted by the encoder chip 42, such errors can be in the form of an erroneous increase or decrease in the offset. Where this offset is determinative of the rotational angle of the exciter magnet 38, any such error will obviously result in an erroneous rotational angle.

Referring now to FIGS. 6 and 7, in an aspect of the invention, a rotary magnetic encoder 100 (see FIG. 6) can be contained in substantially rigid housing 150 (see FIG. 7) which can operate in cooperation with a rotary encoder shaft similar to that described above with respect to FIGS. 1-4. Accordingly, the rotary magnetic encoder 100 can provide absolute position sensing and reporting for a rotary encoder shaft. The rotary magnetic encoder 100 can include one more circuit boards which can be disposed over one another and in communication with one another, such as a first circuit board 102, a second circuit board 104 and a third circuit board 106, disposed over one another. In one aspect, a magnetic rotary angle sensor 110 integrated circuit chip and various electronics can be surface mounted on a first side of the first circuit board 102, and a magnetic rotary turn sensor 112 integrated circuit chip and various electronics can be surface mounted on a second side of the first circuit board 102, opposing the first side. The angle sensor 110 and the turn sensor 112 can be in communication with one another, such as by circuit board through-hole vias.

A couple of preferred examples of a commercially available magnetic rotary angle sensors are the iC-TW11 10-Bit Ultra Low Power Magnetic Absolute Rotary Encoder chip made by iC Hause Integrated Circuits of Am Kuemmerling 18, 55294 Bodenheim, Germany, as well as the AM8192B Angular Mgnetic Sensor Chip by Renishaw plc of New Mills, Wotton-under-Edge, Gloucestershire, United Kingdom. A preferred example of a commercially available magnetic rotary turn sensor is the iC-PV Battery-Buffered Hall Multiturn Encoder made by iC Hause Integrated Circuits of Am Kuemmerling 18, 55294 Bodenheim, Germany.

An exciter magnet 114 (shown in cutaway in FIG. 6, contained in a magnet housing 116) can be axially aligned with centers of the angle sensor 110 and the turn sensor 112 along a central axis 118 so as to react with an angle sensor region 120 of the angle sensor 110 and a turn sensor region 122 the turn sensor 112. The exciter magnet 114 can be a bi-polar disk-shaped permanent magnet that is fixed in a pocket of the magnet housing 116 at an end of an encoder shaft 36 similar to the exciter magnet 38. The angle sensor region 120 and the turn sensor region 122 can each include Hall Effect sensors (on each of the angle sensor 110 and the turn sensor 112, respectively) as described above with respect to FIG. 5.

With additional reference to FIG. 8, the angle sensor region 120 can allow the angle sensor 110 to determine a current angle of the rotary system (via rotation of the exciter magnet 114) through 360° of rotation with respect to a first reference line 130. The turn sensor region 122 of the turn sensor 112, disposed along the central axis 118, can be used to determine complete rotations or turns (positive or negative) of the rotary system (via rotation of the exciter magnet 114) through 360° of rotation with respect to a second reference line 132. Accordingly, the angle sensor 110 can track a current angle of the rotary system while the turn sensor 112 can track a count of complete rotations or turns of the rotary system.

For example, as the rotary system rotates, the angle sensor 110 can sense this condition accordingly and can determine a current angle of the system with respect to the first reference line 130 (such as 30°). In addition, as the system rotates through a complete rotation in a positive/clock-wise direction with respect to the second reference line 132, the turn sensor 112 can sense this condition and increment the count by one. Conversely, as the system rotates back in a negative/counter-clock-wise direction past the second reference line 132, the turn sensor 112 can sense this condition and decrement the count by one. The count from the turn sensor 112 and the current angle from the angle sensor 110 together can provide an absolute position for the rotary system when queried.

While precise alignment between the first and second references lines 130 and 132, respectively, is ideal, in practical implementations, some error (shown as an angle θ) between the reference lines typically exists. As a result, it can be necessary for a sensor chip, such as the turn sensor 112, to synchronize the measurements between the angle sensor 110 and the turn sensor 112 in order to determine a consistent absolute position. Accordingly, in an aspect of the invention, independently controlled clock signals can be provided to the angle sensor 110 and the turn sensor 112 to selectively control the timing and portions of data being communicated between the sensors. This can allow higher accuracy, lower power consumption and/or lower cost sensors that might not otherwise be configured to provide sensed data in predetermined ways which can be expected by other sensors to nevertheless be used to achieve optimum performance.

Referring again to FIG. 6, a microcontroller 140 and various electronics can be mounted on the second circuit board 104 and can be in communication with the angle sensor 110 and the turn sensor 112. A battery 142 can also be mounted on the second circuit board 104 or elsewhere so as to retain sensor measurements and data held by the angle sensor 110, the turn sensor 112 and the microcontroller 140 in the event of a power signal loss.

A connector 144 and various electronics can be mounted on the third circuit board 106. The connector can be used to route cable and wiring 146 for the angle sensor 110, the turn sensor 112, the microcontroller 140 and/or various electronics, including for providing a power signal to the aforementioned components, configuring the aforementioned components, and reporting the absolute position sensed by the rotary magnetic encoder 100.

Referring now to FIG. 9, in a first aspect of the invention, the microcontroller 140 can be configured to independently control a first clock signal 160 ("Angle Sensor Clock signal") to the angle sensor 110 and a second clock signal 162 ("Turn Sensor Clock signal") to the turn sensor 112, so as to selectively control the timing and portions of data being communicated between the angle sensor 110 and the turn sensor 112. Accordingly, the first clock signal 160 can be controlled to first cause the angle sensor 110 to communicate a sensed angle of rotation 164 to the turn sensor 112. Then, the second clock signal 162 can be controlled to cause the turn sensor 112 to receive the sensed angle data and communicate an output 166 indicating an absolute position for the rotary system, including the sensed angle of rotation from the angle sensor 110 and the count from the turn sensor 112, to the microcontroller 140.

With additional reference to the timing diagram of FIG. 10, the microcontroller 140 can control the first clock signal 160 to activate at a time period A in order to provide a "Setup" pulse for the angle sensor 110 as may be required according to the characteristics of the angle sensor 110. Accordingly, the setup pulse for the angle sensor 110 can trigger the angle sensor 110 to sample, store and transmit a currently sensed angle. In one example, the setup pulse can comprise asserting the first clock signal 160 low through an entire clock signal cycle. During the time period A, the second clock signal 162 is not yet activated, and therefore the turn sensor 112 does not yet receive data from the angle sensor 110.

Next, in time period B, the microcontroller 140 can control the first clock signal 160 to toggle to allow the angle sensor 110 to communicate data bits on clock signal cycles. However, to the extent the angle sensor 110 initially provides extraneous data bits, the microcontroller 140 can keep the second clock signal 162 to the turn sensor 112 deactivated so as to not allow the turn sensor 112 to receive the extraneous data bits ("Ignored Data").

Next, in time period C, which can coincide near an end of time period B and/or a beginning of time period D, the microcontroller 140 can control the second clock signal 162 to activate by providing a "Setup" pulse for the turn sensor 112 as may be required according to the characteristics of the turn sensor 112. Accordingly, the setup pulse for the turn sensor 112 can trigger the turn sensor 112 to prepare to receive sensed angle data from the angle sensor 110, to synchronize measurements between the angle sensor 110 and the turn sensor 112 for determining an absolute position, and to provide the output 166 indicating an absolute position for the rotary system, including the sensed angle of rotation from the angle sensor 110 and the count from the turn sensor 112. In one example, the setup pulse can comprise asserting the second clock signal 162 after a period of non-assertion. During the time period A, the second clock signal 162 is not yet activated and therefore does not yet receive data from the angle sensor 110.

Next, in overlapping time periods D and E, the microcontroller 140 can control the first clock signal 160 to continue toggling to allow the angle sensor 110 to communicate the sensed angle data, which can begin with a most-significant bit (such as "AD13," "AD12," "AD11," and so forth), and can control the second clock signal 162 to begin toggling to allow the turn sensor 112 to receive the sensed angle data (the "AD13," "AD12," "AD11," and so forth), having skipped the earlier "Ignored Data" from the angle sensor 110. In addition, the microcontroller 140 controlling the second clock signal 162 to toggle can allow the turn sensor 112 to being communicating the count, which can begin with a most-significant bit (such as "TD30," "TD29," "TD28," and so forth), However, when the angle sensor 110 communicates the last sensed angle data bit (such as "AD0"), to the extent the angle sensor 110 can continue to then provide extraneous data bits, the microcontroller 140 can stop the first clock signal 160 from toggling in time period F, so as to not allow the angle sensor 110 to transmit the extraneous data bits ("Ignored Data"). The microcontroller 140 can still continue toggling the second clock signal 162 in time period E, so as to allow the turn sensor 112 to transmit the absolute position to the microcontroller 140 via the output 166, including the count and the currently sensed angle.

Finally, in time period G, after having received the absolute position, the microcontroller 140 can control the second clock signal 162 to also stop toggling, which can also prevent the turn sensor 112 from transmitting extraneous data bits. It will be appreciated that the microcontroller 140 can be preconfigured to control a wide variety of angle sensors and turn sensors in various combinations, including with differing requirements for setup pulses and/or various handling of extraneous bits as desired. Such variations are deemed within the scope of the invention.

Referring now to FIG. 11, in a second aspect of the invention, the microcontroller 240 can be configured to independently control a first clock signal 260 ("Angle Sensor Clock signal") to an angle sensor 210 and a second clock signal 262 ("Turn Sensor Clock signal") to a turn sensor 212, so as to selectively control the timing and portions of data being communicated via a Serial Peripheral Interface (SPI) and/or a Synchronous Serial Interface (SSI). Accordingly, the first clock signal 260 can be controlled to first transmit a command to the angle sensor 210, via serial input 270, for the angle sensor 210 to communicate a sensed angle of rotation, via serial output 272. Then, the second clock signal 262 can be controlled to cause the turn sensor 212 to receive the sensed angle data and communicate an output 266 indicating an absolute position for the rotary system, including the sensed angle of rotation from the angle sensor 210 and the count from the turn sensor 212, to the microcontroller 240.

With additional reference to the timing diagram of FIG. 12, the microcontroller 240 can control the first clock signal 260 to activate at a time period I for the microcontroller 240 to transmit a first command to the angle sensor 210 via the serial input 270. The first command can be a message instructing the angle sensor 210 to communicate a sensed angle of rotation. Next, in time period II, a break can be inserted, then in time period III, the microcontroller 240 can optionally transmit a second command to the angle sensor 210 via the serial input 270. During the time period I and II, the second clock signal 262 is not yet activated, and the turn sensor 212 therefore does not yet receive data from the angle sensor 210.

However, in time period III, while the microcontroller 240 optionally transmits a second command to the angle sensor 210, the angle sensor 210 communicates data bits on clock signal cycles. To the extent the angle sensor 210 initially provides extraneous data bits, the microcontroller 240 can keep the second clock signal 262 to the turn sensor 212 deactivated so as to not allow the turn sensor 212 to receive the extraneous data bits ("Ignored Data").

Next, in time period IV, the microcontroller 240 can control the first clock signal 260 to continue toggling to allow the angle sensor 210 to communicate the sensed angle data. In addition, the microcontroller 240 can control the second clock signal 262 to activate toggling to receive sensed angle data from the angle sensor 210, to synchronize measurements between the angle sensor 210 and the turn sensor 212 for determining an absolute position, and to provide the output 266 indicating an absolute position for the rotary system, including the sensed angle of rotation from the angle sensor 210 and the count from the turn sensor 212. Initially, the turn sensor 212 can communicate the count to the microcontroller 240, and then can communicate the sensed angle of rotation to the microcontroller 240, via the output 266.

Next, in time period V, to the extent the angle sensor 210 can continue to then provide extraneous data bits, the microcontroller 240 can stop the first clock signal 260 from toggling, so as to not allow the angle sensor 210 to transmit such extraneous data bits. The microcontroller 240 can still continue toggling the second clock signal 262 in time period V, so as to allow the turn sensor 212 to transmit the absolute position to the microcontroller 240 via the output 266, including the count and the currently sensed angle.

Finally, in time period VI, after having received the absolute position, the microcontroller 240 can control the second clock signal 162 to also stop toggling, which can also prevent the turn sensor 212 from transmitting extraneous data bits. It will be appreciated that the microcontroller 240 can be preconfigured to control a wide variety of angle sensors and turn sensors in various combinations via SPI and/or SSI. Such variations are deemed within the scope of the invention.

It will be appreciated that various aspects of the first embodiment described above with respect to FIGS. 9 and 10 could be combined in a system with various aspects of the second embodiment described above with respect to FIGS. 11 and 12 in a hybrid system. Such variations are deemed within the scope of the invention.

Accordingly, one aspect of the present invention may provide a system for position sensing including: an angle sensor configured to sense an angle of rotation; a turn sensor in communication with the angle sensor, the turn sensor being configured to maintain a count of sensed rotations; and first and second clock signals independently controlled from one another, the first clock signal being provided to the angle sensor, and the second clock signal being provided to the turn sensor. The first clock signal can cause the angle sensor to communicate a sensed angle of rotation to the turn sensor, and the second clock signal can cause the turn sensor to communicate an output including the sensed angle of rotation and the count.

Another aspect can provide a method for position sensing including: providing a first clock signal to an angle sensor configured to sense an angle of rotation; and providing a second clock signal independently controlled from the first clock signal to a turn sensor in communication with the angle sensor, the turn sensor being configured to maintain a count of sensed rotations. The first clock signal can cause the angle sensor to communicate a sensed angle of rotation to the turn sensor, and the second clock signal can cause the turn sensor to communicate an output including the sensed angle of rotation and the count.

Another aspect can provide a rotary magnetic encoder for position sensing including: an exciter magnet; first and second circuit boards disposed over one another; an angle sensor mounted on a first side of the first circuit board, the angle sensor being configured to sense an angle of rotation; a turn sensor mounted on a second side of the first circuit board, the turn sensor being in communication with the angle sensor, the turn sensor being configured to maintain a count of sensed rotations; a microcontroller mounted on a first side of the second circuit board, the microcontroller being in communication with the angle sensor and the turn sensor; and a housing containing the exciter magnet and the first and second circuit boards. A center of the angle sensor and a center of the turn sensor can be axially aligned with a center of the exciter magnet. The microcontroller can provide first and second clock signals independently controlled from one another, the first clock signal being provided to the angle sensor, and the second clock signal being provided to the turn sensor. The first clock signal can cause the angle sensor to communicate a sensed angle of rotation to the turn sensor, and the second clock signal can cause the turn sensor to communicate an output including the sensed angle of rotation and the count to the microcontroller.

Understandably, the present invention has been described above in terms of one or more preferred embodiments and methods. It is recognized that various alternatives and modifications can be made to these embodiments and methods that are within the scope of the present invention. Various alternatives are contemplated as being within the scope of the present invention. It is also to be understood that, although the foregoing description and drawings describe and illustrate in detail one or more preferred embodiments of the present invention, to those skilled in the art to which the present invention relates, the present disclosure will suggest It is claimed:

1. A system for position sensing comprising:
an angle sensor configured to sense an angle of rotation;
a turn sensor in communication with the angle sensor, the turn sensor being configured to maintain a count of sensed rotations; and
first and second clock signals independently controlled from one another, the first clock signal being provided to the angle sensor, and the second clock signal being provided to the turn sensor,
wherein the first clock signal causes the angle sensor to communicate a sensed angle of rotation to the turn sensor, and the second clock signal causes the turn sensor to communicate an output including the sensed angle of rotation and the count to a microcontroller.

2. The system of claim 1, wherein after the angle sensor communicates the sensed angle of rotation, the first clock signal is deactivated to cause the angle sensor to stop communicating data bits.

3. The system of claim 1, wherein before the angle sensor communicates the sensed angle of rotation, the second clock signal is deactivated to cause the turn sensor to not receive data bits communicated by the angle sensor.

4. The system of claim 1, wherein the first clock signal is initially deactivated, and then the first clock signal is activated to provide a setup pulse to the angle sensor followed by toggling.

5. The system of claim 1, wherein the second clock signal is initially deactivated, and then the second clock signal is activated to provide a setup pulse to the turn sensor as the angle sensor begins to communicate the sensed angle of rotation.

6. The system of claim 1, wherein the microcontroller provides the first and second clock signals.

7. The system of claim 1, further comprising a circuit board, wherein the angle sensor and the turn sensor are mounted on opposing sides of the circuit board.

8. The system of claim 7, further comprising a magnet, wherein a center of the angle sensor and a center of the turn sensor are axially aligned with a center of the magnet.

9. The system of claim 1, wherein the sensed angle of rotation is communicated by at least one of a Serial Peripheral Interface (SPI) and a Synchronous Serial Interface (SSI).

10. A method for position sensing comprising:
providing a first clock signal to an angle sensor configured to sense an angle of rotation; and
providing a second clock signal independently controlled from the first clock signal to a turn sensor in communication with the angle sensor, the turn sensor being configured to maintain a count of sensed rotations,
wherein the first clock signal causes the angle sensor to communicate a sensed angle of rotation to the turn sensor, and the second clock signal causes the turn sensor to communicate an output including the sensed angle of rotation and the count to a microcontroller.

11. The method of claim 10, further comprising after the angle sensor communicates the sensed angle of rotation, deactivating the first clock signal to cause the angle sensor to stop communicating data bits.

12. The method of claim 10, further comprising before the angle sensor communicates the sensed angle of rotation, deactivating the second clock signal to cause the turn sensor to not receive data bits communicated by the angle sensor.

13. The method of claim 10, further comprising initially deactivating the first clock signal, and then activating the first clock signal to provide a setup pulse to the angle sensor followed by toggling.

14. The method of claim 10, further comprising initially deactivating the second clock signal, and then activating the second clock signal to provide a setup pulse to the turn sensor as the angle sensor begins to communicate the sensed angle of rotation.

15. A rotary magnetic encoder for position sensing comprising:
an exciter magnet;
first and second circuit boards disposed over one another;
an angle sensor mounted on a first side of the first circuit board, the angle sensor being configured to sense an angle of rotation;
a turn sensor mounted on a second side of the first circuit board, the turn sensor being in communication with the angle sensor, the turn sensor being configured to maintain a count of sensed rotations;
a microcontroller mounted on a first side of the second circuit board, the microcontroller being in communication with the angle sensor and the turn sensor; and
a housing containing the exciter magnet and the first and second circuit boards,
wherein a center of the angle sensor and a center of the turn sensor are axially aligned with a center of the exciter magnet,
wherein the microcontroller provides first and second clock signals independently controlled from one another, the first clock signal being provided to the angle sensor, and the second clock signal being provided to the turn sensor, and
wherein the first clock signal causes the angle sensor to communicate a sensed angle of rotation to the turn sensor, and the second clock signal causes the turn sensor to communicate an output including the sensed angle of rotation and the count to the microcontroller.

16. The rotary magnetic encoder of claim 15, wherein after the angle sensor communicates the sensed angle of rotation, the microcontroller deactivates the first clock signal to cause the angle sensor to stop communicating data bits.

17. The rotary magnetic encoder of claim 15, wherein before the angle sensor communicates the sensed angle of rotation, the microcontroller deactivates the second clock signal to cause the turn sensor to not receive data bits communicated by the angle sensor.

18. The rotary magnetic encoder of claim 15, wherein the microcontroller initially deactivates the first clock signal, and then the microcontroller activates the first clock signal to provide a setup pulse to the angle sensor followed by toggling.

19. The rotary magnetic encoder of claim 15, wherein the microcontroller initially deactivates the second clock signal, and then the microcontroller activates the second clock signal to provide a setup pulse to the turn sensor as the angle sensor begins to communicate the sensed angle of rotation.

* * * * *